Patented Aug. 9, 1927.

1,638,677

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF TREATING PHOSPHATE ROCK.

No Drawing.  Application filed June 23, 1925. Serial No. 39,044.

My invention relates to a process of treating phosphate rock in order to liberate the phosphoric acid and make the same available in the form of ammonium phosphates.

It is an object of this invention to provide a simple, efficient and economical process of treating phosphate rock with ammonium sulphate in a closed retort to form ammonium phosphates.

My invention consists in the steps of the process hereinafter described and claimed.

Finely ground phosphate rock $Ca_3(PO_4)_2$ is mixed with ammonium sulphate and placed in a closed retort and heated. When the temperature reaches about 100° C. the normal ammonium sulphate is decomposed into acid ammonium sulphate and ammonia. The heating is continued up to approximately 300° C. The decomposition of normal ammonium sulphate into ammonia and acid ammonium sulphate is not complete until about 300° C. has been reached. Care should be taken that the temperature does not exceed 300° C. or else an acid phosphate merely will be produced. Ammonia itself, it is well known, dissociates into nitrogen and hydrogen at a temperature slightly below 500° C.

The ammonium sulphate reacts on the phosphate rock apparently as follows:

$$Ca_3(PO_4)_2 + 3NH_4HSO_4 = 3CaSO_4 + 2NH_4H_2PO_4 + NH_3$$

As the temperature is increased to above 200° the mono ammonium phosphate $NH_4H_2PO_4$ is converted to ammonium mono meta phosphate, as follows:

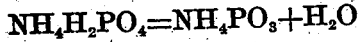

$$NH_4H_2PO_4 = NH_4PO_3 + H_2O$$

The various combinations and reactions of phosphoric acid and ammonia are uncertain and complicated, but the final product in the retort is a mixture of ammonium mono meta phosphate which predominates with other phosphates such as ammonium pyro phosphate $(NH_4)_2P_2O_7$ with calcium pyro phosphate $Ca_2P_2O_7$ and calcium sulphate.

Apparently the normal di and mono ammonium phosphates are formed in the beginning at certain temperatures and as the temperatures are elevated the phosphates just mentioned are probably changed as the ammonium radicle is liberated or are combined in other higher combinations.

The final product depends more or less upon the temperatures at which the mixture is held. Care should be taken, as above stated, to keep the temperature below the decomposition point of ammonia. Any excess ammonia liberated may be conducted from the retort and recovered by any suitable means.

The reaction in the retort appears to be facilitated by pressure, which may be regulated by a valve in the ammonia outlet pipe. When a pressure of about ten pounds is used, the process is ninety per cent (90%) efficient. Without pressure, about seventy-five per cent (75%) efficient.

The mixture in the retort consisting of ammonium phosphates and calcium sulphate may be used as a fertilizer, or if desired, the ammonium phosphate may be separated from the mixture by filtration and crystallization or any other suitable or preferred method.

Various changes may be made in the steps of the process by those skilled in the art without departing from the spirit of my invention, as claimed.

I claim:

1. A process of treating phosphate rock comprising heating a mixture of ground phosphate rock and ammonium sulphate in a closed retort to a temperature not to exceed 300° C. to produce ammonium phosphates and calcium sulphate.

2. A process of treating phosphate rock comprising heating a mixture of ground phosphate rock and ammonium sulphate in a closed retort to a temperature not to exceed 300° C. to produce ammonium phosphates, calcium sulphates and ammonia.

3. A process of treating phosphate rock comprising heating a mixture of ground phosphate rock and ammonium sulphate in a closed retort to a temperature not to exceed 300° C. to produce ammonium mono meta phosphate.

4. A process of treating phosphate rock comprising heating a mixture of ground phosphate rock and ammonium sulphate in a closed retort under pressure to a temperature not to excess 300° C. to produce ammonium phosphates and calcium sulphate.

In testimony whereof I have signed my name to this specification.

HENRY BLUMENBERG, JR.